United States Patent [19]
Nezu

[11] Patent Number: 5,394,953
[45] Date of Patent: Mar. 7, 1995

[54] METHOD AND DEVICE FOR UNCOUPLING A SELF-PROPELLED TRUCK FROM A CARRYING TRUCK

[75] Inventor: Takashi Nezu, Ohme, Japan

[73] Assignee: Tachi-s Co., Ltd., Tokyo, Japan

[21] Appl. No.: 74,963

[22] Filed: Jun. 11, 1993

[51] Int. Cl.⁶ .............................................. B60D 1/10
[52] U.S. Cl. ................................... 180/168; 180/169; 280/479.1; 213/75 R; 213/189
[58] Field of Search ............... 180/167, 168, 169; 213/75 R, 188, 189, 211, 212; 280/477, 478.1, 479.1

[56] References Cited

U.S. PATENT DOCUMENTS

| | | | |
|---|---|---|---|
| 3,150,609 | 9/1964 | Bradt | 213/75 A |
| 4,807,714 | 2/1989 | Blau et al. | 180/168 |
| 5,109,940 | 5/1992 | Yardley | 180/168 |
| 5,154,240 | 10/1992 | Yardley | 180/168 |
| 5,219,036 | 6/1993 | Schunger et al. | 180/168 |
| 5,263,734 | 11/1993 | Coemen et al. | 280/479.1 |

FOREIGN PATENT DOCUMENTS 4328008  11/1992  Japan .

*Primary Examiner*—Richard M. Camby
*Attorney, Agent, or Firm*—Browdy and neimark

[57] ABSTRACT

A method and device for uncoupling a self-propelled truck from a carring truck, wherein an uncoupling point defined on a path is detected by a sensor so as to temporarily stop a motor of the self-propelled truck, thereby provisionally stopping the two trucks at the uncoupling point, then another motor is driven to cause disengagement in an engagement element, and thereafter only the self-propelled truck is again moved, while maintaining such disengagement, so as to complete the uncoupling of the carrying truck from the self-propelled truck.

10 Claims, 4 Drawing Sheets

METHOD AND DEVICE FOR UNCOUPLING A SELF-PROPELLED TRUCK FROM A CARRYING TRUCK

BACKGROUND OF INVENTION

1. Field of Invention

The present invention relates to a method and device for uncoupling a self-propelled truck from a carrying truck which is coupled therewith via a coupler, at a predetermined uncoupling point.

2. Description of Prior Art

Most of large industrial factories and storehouses are equipped with some self-propelled trucks and carrying trucks to be coupled therewith as an indoor automated transfer means for transferring goods and articles to a destination in production lines or a storage section.

In general, the self-propelled truck has a self-driving mechanism comprising driving wheels, a motor operatively connected to the driving wheels, and a photo-sensitive guidance and control system, so that the truck moves by itself moves along a given path labelled by a light reflecting tape. This self-propelled truck is provided with a device for coupling and uncoupling it with a carrying truck which is adapted fro carrying articles thereon.

A known device for coupling the self-propelled truck is constructed by a pair of male and female engagement elements, one of them being at the self-propelled truck and another of them provided at the carrying truck. In most cases, those two separate engagement elements require a connecting pin for locking their mutual engagement to complete the coupling between the self-propelled and carrying trucks, which needs manual insertion and removal of the connecting pin by workers in the coupling steps.

In this construction, there has been a coupling/uncoupling device as known from the Japanese Patent Laid-Open Pub. No. 4-328008, which features the use of a male engagement pin at a carrying truck, a vertically movable female engagement member at a self-propelled truck, and an uncoupling stand member at a given uncoupling point on the path along which the two trucks move. In brief, according thereto, the carrying truck is automatically coupled with the self-propelled truck at a predetermined coupling point, with the male engagement pin of the former truck being brought to engagement with the female engagement member of the latter truck, and on the other hand, when the two coupled trucks reach the uncoupling point, the vertically movable female engagement member is raised, riding on the uncoupling stand member, for disengagement from the engagement pin.

Particularly, with regard to the uncoupling system in this prior art, it has been found defective that even after uncoupling from the self-propelled truck, the carrying truck will move on under its inertia force and overrun beyond the uncoupling point to stop at an undesired point. Therefore, it is difficult to cause the uncoupled carrying truck to be stopped precisely at the uncoupling point, and this will be true even though the point may be relocated for the inertia overrun degree because the floor on which the truck moves is not always flat, including an uneven and sloped areas.

Moreover, the same inertia overrun effect also involves a possibility for the uncoupled carrying truck to be re-engaged with the self-propelled truck. In other words, at the uncoupling point, before the the female engagement member, which has been raised by the stand member, is lowered to a home horizontal position, the carrying truck is being still moved with the self-propelled truck, with the result that the female engagement member is again engaged with the male engagement pin, hindering the uncoupling operation.

Additionally, the uncoupling stand member erected on the floor impairs a working space and lowers a safety conditions on the floor.

SUMMARY OF THE INVENTION

In view of the above-stated drawbacks, it is a primary purpose of the present invention to provide a method for uncoupling the self-propelled truck from a carrying truck, which permits the carrying truck to be uncoupled from the self-propelled truck, precisely at a predetermined uncoupling point, in a positive manner.

In order to achieve such purpose, in accordance with the present invention, there is basically provided the steps of:
- permitting an uncoupling point to be detected by a sensor means provided in said self-propelled truck;
- permitting disengagement of one of female and male engagement means from another of them by means of a second motor in order to uncouple the carrying truck from the self-propelled truck;
- if the sensor means detects the uncoupling point, causing a motor of the self-propelled truck to be temporarily stopped, thereby provisionally stopping the carrying truck, while causing the second motor to be driven for effecting the foregoing disengagement between the female and male engagement means;
- then, restarting drive of the motor of self-propelled truck to move only the self-propelled truck, while maintaining such disengagement, to complete uncoupling the carrying truck from the self-propelled truck; and
- after the self-propelled truck is moved away from the carrying truck, restarting drive of the second motor to cause of one of the two engagement means to return to an initial position.

Accordingly, the carrying truck is stopped and uncoupled positively from the self-propelled truck.

Further, in the above-stated basic method, a provisional stoppage time may be set for effecting the provisional stop of carrying truck, by means of a timer, for example, including a length of time enough for the second motor to drive for completing the disengagement between the female and male engagement means. Furthermore, an engagement means return time may be set by a timer, for example, including a time enough for the self-propelled truck to move away a sufficient distance from the carrying truck, so that one of the female and male engagement means is returned to the initial position, without re-engagement between them. Still further, a deceleration point may be defined on the path before the uncoupling point, where both self-propelled and carrying trucks are decelerated before being stopped at the uncoupling point.

It is a second purpose of the invention to provide an improved device for effecting the above-described uncoupling.

To this end, the uncoupling device in accordance with the present invention, basically comprises:
 a motor;

a support lever means operatively connected the motor, upon which support lever means, said one of those female and male engagement meas is supported;

a means for defining an uncoupling point on a path along which the self-propelled truck moves, which uncoupling point is an point where the carrying truck is to be uncoupled from the self-propelled truck;

a sensor means for detecting the uncoupling point, sensitive to such means, which sensor means is electrically connected with the motor via a control means;

wherein if the sensor means detects the uncoupling point, the motor is driven to actuate the support lever means to disengage one of the female and male engagement means from another of them, so that the carrying truck is uncoupled from the self-propelled truck at the uncoupling point.

In one aspect of the invention, the means for defining an uncoupling point may be a light reflecting tape disposed in the path, and the sensor means may comprises a photosensor. The support lever means may comprise a support lever member free to move vertically relative to the self-propelled and carrying trucks, and a cam may be used as a means for transforming the drive of the motor into the vertical movement of that support lever member.

Other features, advantages and uses will be obvious or become apparent from a consideration of the following detailed description and annexed drawings.

DETAILED DESCRIPTION OF PREFERRED EMBODIMENT OF THE INVENTION

Referring to FIGS. 1 through 4, there is illustrated one embodiment of the present invention, which is for uncoupling a self-propelled truck from a carrying truck.

In accordance with the present invention, as generally designated by (10), an uncoupling device is provided, by means of which the carrying truck (16) is to be uncoupled from the self-propelled truck (14).

Figure 2:
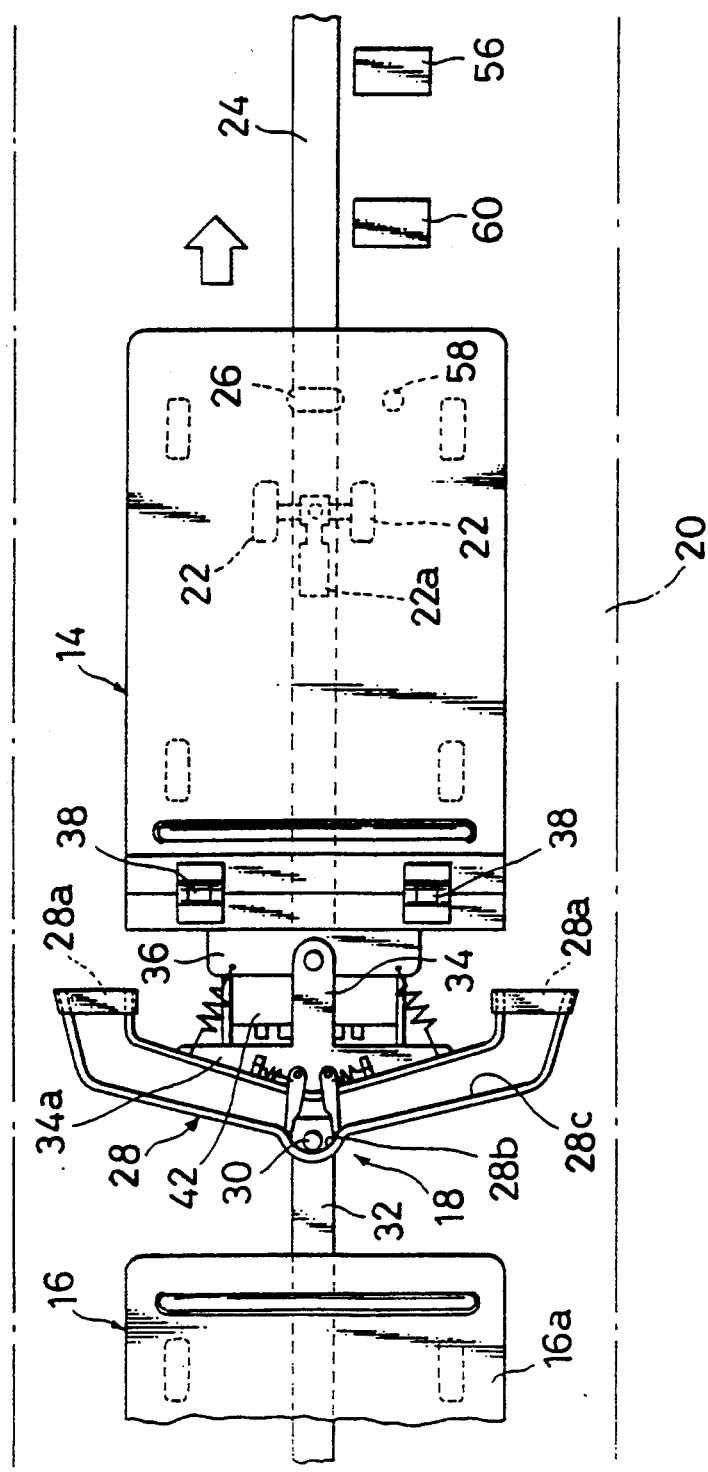
FIG. 2 is a plan view showing the state where the self-propelled truck coupled with the carrying truck is moved toward an uncoupling point.

As can be seen from FIG. 2, the self-controlled truck (14) includes a proper known photo-sensitive guidance and control system which is, for example, comprised of a light reflecting tape (24) affixed on a floor along a predetermined path (20), a photosensor (26) provided on the reverse side of truck (14), driving wheels (22), and a motor (22a). The motor (22a) is controlled by a suitable control circuit (not shown), according to a data inputted from the photosensor (26) detecting a light reflected from the tape (24), so as to cause driving, stopping and turning of the wheels (22) under a computerized control, so that the truck (14) is moved on along the predetermined path (20). This is, however, not a principle part of the present invention, and no further description is given thereof.

Figure 1:
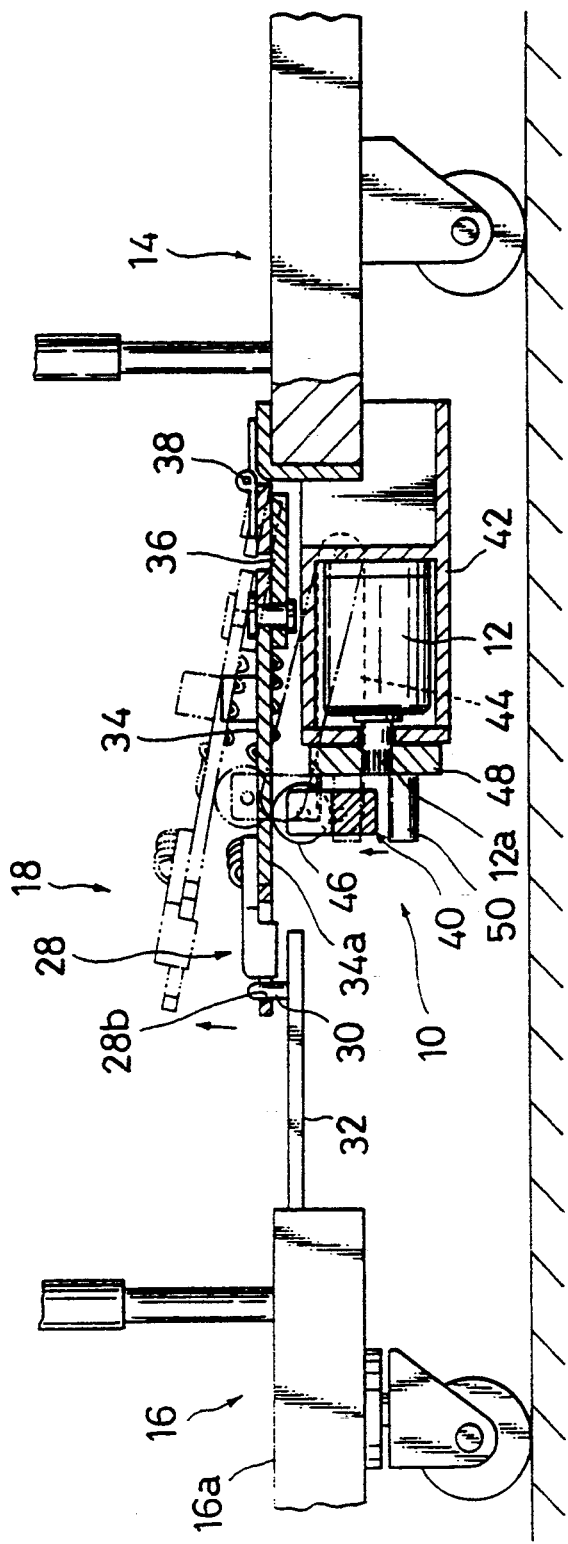
FIG. 1 is a longitudinally sectional view showing a principal part of a device in accordance with the present invention, which is for uncoupling a self-propelled truck from a carrying truck.

Referring to FIGS. 1 and 2, designation (18) indicates a coupler for coupling the self-propelled truck (14) with the carrying truck (16). The coupler (18) itself is known from the previously stated Japanese Patent Laid-Open Pub. No. 4-328008, and reference may be made thereto for further details. Briefly stated, the coupler (16) comprises a female engagement member (28) and a male engagement pin (30). The male engagement pin (30) is provided on an arm (32) projected from the forward end of the carrying truck (16). On the other hand, the female engagement member (28) is connected at its arm portion (34) with a hinge element (38) via a base support plate (36), the hinge element (38) being fixed on the rearward end of self-propelled truck (14). Therefore, the engagement member (28) is free to rotate vertically relative to the rearward end of truck (14) as shown in FIG. 1. The engagement member (28) is further formed with an engagement piece (28) having, defined therein, a central engagement area (28b) and a catching sapcing (28a). In an actual coupling process, the foregoing engagement pin (30) is caught in the catching spacing (28a), sliding along the frame section (28c), and completely engaged in the central engagement area (28b). In this way, the two trucks (14)(16) are coupled together. Hence, they can be uncoupled from each other by raising the female engagement member (28) away from the engagement pin (30).

Figure 3:
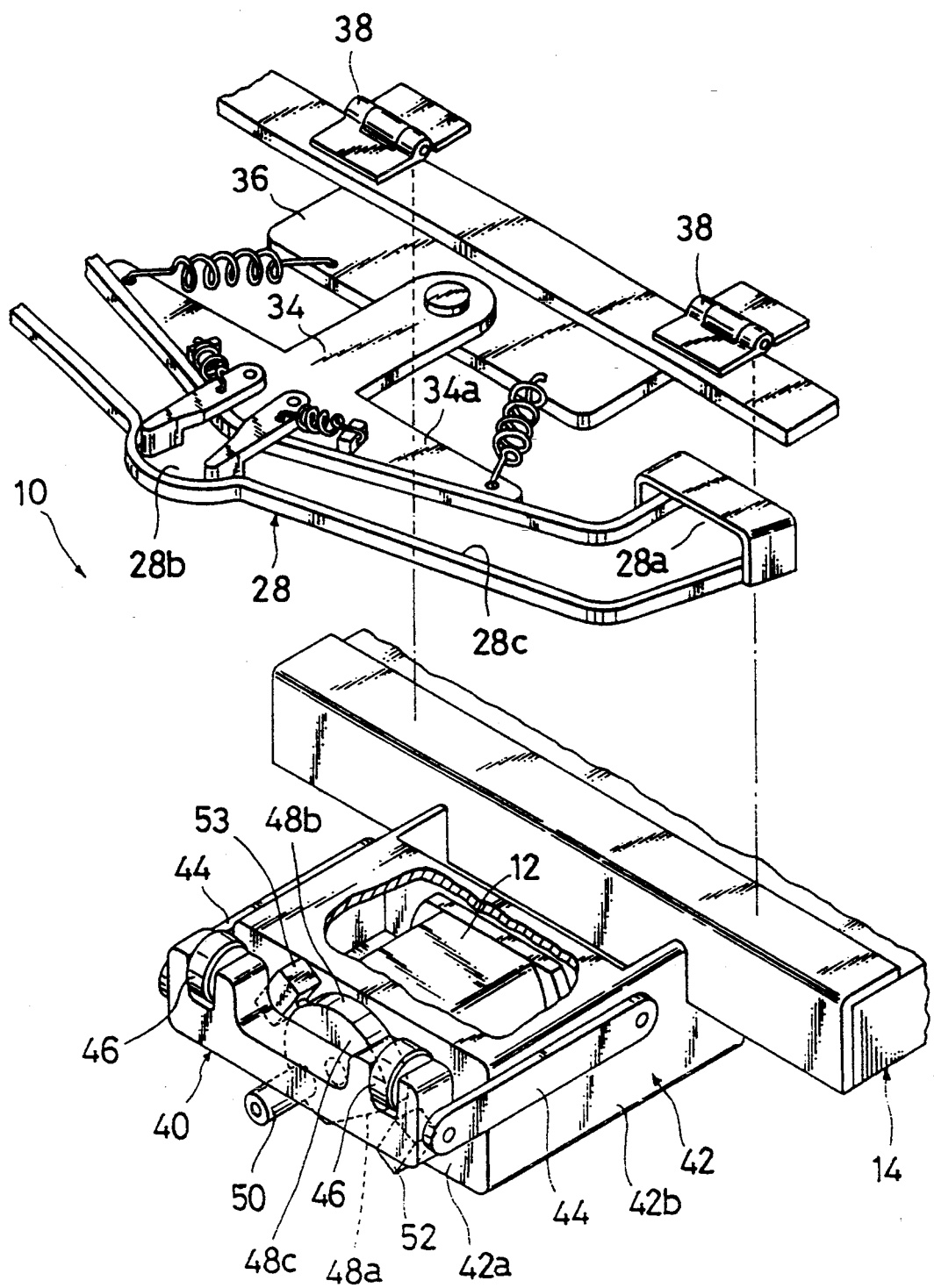
FIG. 3 is a partly broken, schematic perspective view showing an uncoupling device and a female engagement member.
Figure 4:
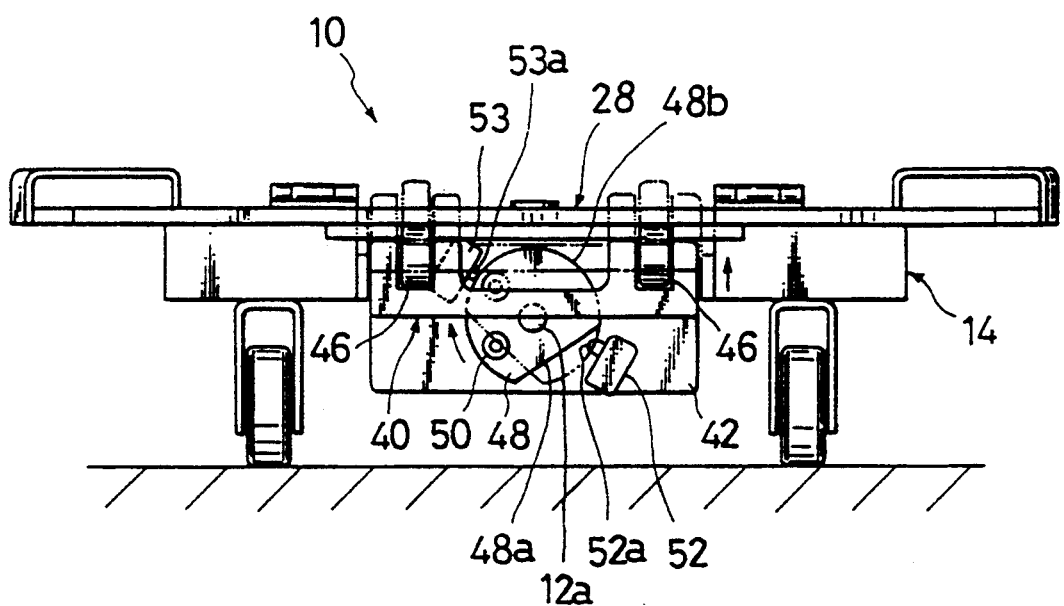
FIG. 4 is a schematic front view of the uncoupling device.

As a means for causing such vertical disengagement motion of female engagement member (28), the aforementioned uncoupling device (10) is shown in FIGS. 1 and 3 as including a support lever member (40) on which is supported the female engagement member (28), a motor (12), and a cam mechanism (48, 50) operatively connected to the motor (12) for vertical movement of the support lever member (40).

Specifically, according to the uncoupling device (10) illustrated, the motor (12) is mounted within a housing (42) whose rearward end is welded fast on the forward end of self-propelled truck (14), and further rotatably provided to both lateral walls of housing (42), are a pair of lateral lever sections (44)(44) of the support lever member (40). Support lever member (40) has a central lever section (43) connected at both ends thereof to the respective forward ends of those two lateral lever sections (44)(44). As seen from FIGS. 1 and 3, the motor (12) has an output shaft (12a) penetrating through the frontal wall (42a) of housing (40), and to that output shaft (12a), a cam (48) is fixedly connected, whereupon operation of the motor (12) causes simultaneous rotation of the cam (48).

The cam (48) is of a generally semi-circular circular configuration, having a cut-away edge (48a) and an arcuate edge (48b). A support rod (50) is fixed on the frontal wall of cam (48) in a manner projecting therefrom. Upon that support rod (50), the central lever section (43) of lever member (40) is rested and supported.

A pair of rollers (46)(46) are rotatably provided on such central lever section (43). As understandable from FIG. 3, the flat plate portion (34a) of female engagement member (28) is placed upon those two rollers (46)(46), whereby the female engagement member (28) is directly supported by the lever member (40) and support rod (50).

In this context, the motor (12) is driven normally or reversely and stopped under a control device (not shown) and responsive to the on-off switch operation of two limit switches (52)(53), as will be explained later, so as to cause clockwise and anticlockwise rotation of both cam (48) and support rod (50) for vertical motion of the lever member (40).

The first and second limit switches (52)(53) are of a self-return push type and arranged on the opposite sides of cam (48), such that their respective switch buttons (52a)(53a) face toward each other on a line passing through the center (12a) at about 45 degrees and projects slightly more inwardly of the circumference of cam (48). Thus, contact of both switch buttons (52a)(53a) with the arcuate edge (48b) of cam turns "on" the corresponding switches (52)(53), by which the not-shown control device instructs the motor (12) to keep on its drive, letting thus the cam (48) continue to rotate. Although not shown, the limit switches (52)(53) are electrically connected with the control device.

The first limit switch (52) is adapted to limit the anticlockwise rotation of motor (12) and also limit the downward displacement of the support rod (50). This state is just shown by the solid line in FIG. 4. Namely, the cut-away edge (48a) of cam (48) is located at the first limit switch (52), placing the switch (52) in an "off" state, whereby the adjacent support rod (50) is positioned at a lowest level where the lever member (40) lies horizontally in parallel with the longitudinal axis of truck (14).

The second limit switch (53) is adapted to limit the clockwise rotation of motor (12) and also limit the upward displacement of the support rod (50). This state is understandable from the two-dot chain line in FIG. 4. Namely, in this case, as the cam (48) is rotated clockwise by the normal drive of motor (12) in the arrow direction, the cut-away edge (48a) of cam (48) is displaced upwardly to the second limit switch (52), which simultaneously causes upward displacement of both support rod (50) and lever member (40) to a highest level, so that the switch (52) is placed in an "off" state. Then, the lever member (40) is raised and stopped to the position shown by the two-dot chain line in FIGS. 1 and 4.

The foregoing arrangement of cam (48) and limit switches (52)(53) limits the rotation range of cam (48) or the vertical rotative displacement range of support rod (50). However, it is not limited to the illustrated embodiment, but any other arrangement may be applied thereto insofar as it serves this purpose.

With this structure, the downward and upward position of support rod (50) is detected through the first and second switches (52)(53), in which case, an off signal is outputted from one of those switches (52)(53) and processed by a not-shown processing unit to stop the motor (12), whereby the femamle engagement member (28) may be retained at the lowered position as shown by the solid line in FIG. 1 or at the raised position as shown by the two-dot chain line in FIG. 1, with respect to the male engagement pin (30) of the carrying truck (16).

Description will now be made of a method for effecting above-described uncoupling operations.

As shown in FIG. 2, an uncoupling point is defined by an uncoupling position tape (56) (of course a light reflecting tape) which is adhered on a predetermined point in the path (20) in reference to the maing guiding light reflecting tape (24). A photosensor (58) is provided at the reverse side of the self-propelled truck (14) in order to detect the uncoupling point by sensing a light reflecting from the tape (56).

It should be understood that the uncoupling position tape (56) and photosensor (58) forms a part of the above-stated uncoupling device (10), and that the photosensor (58) is electrically connected with the not-shown control device. Thus, the detection of the uncoupling position tape (56) by the photosensor (58) is recognized by the control device to be the arrival of the carrying truck (16) at the uncoupling point.

When the carrying truck (14) trailed by the self-propelled truck (16) is brought to the uncoupling point (at (56), a detection signal is emitted from the photosensor (58) into the control device which then instructs the first motor (22a) of self-propelled truck (14) to temporarily cease its drive, thereby provisionally stopping both two trucks (14)(16) at the uncoupling point.

During this provisional stoppage, the second motor (12) of uncoupling device (10) is driven normally to cause the clockwise rotation of cam (48), thereby displacing upwardly the support rod (50) to raise the lever member (40) and thus the female engagement member (28) away from engagement with the male engagement pin (30) of carrying truck (16) up to the position indicated by the two-dot chain line in FIG. 1. At this moment, the carrying truck (14) is uncoupled from the self-propelled truck (16). Thereafter, the motor (22a) is again driven to restart movement of the self-propelled truck (16), while the second motor (12) is kept in an inoperative state, so that the self-propelled truck (16) restarts its automatic running along the given path (20), with the female engagement member (28) raised as it is, whereas the carrying truck (14) is left at the uncoupling point. After In accordance with the present invention, a time for the foregoing provisional stoppage (namely a time after the stop of the first motor (22a)) should be preset by a suitable timer (not shown), and such provisional stoppage time is counted by the timer until the first motor (22a) is again driven for restarting the movement of self-propelled truck (14). Of course, the provisional stoppage time includes a time for the second motor (12) to drive for completing the above-mentioned raising of the female engagement member (28) away from the male engagement pin (30).

After lapse of this provisional stoppage time, the stopped motor (22a) is again driven for restarting the movement of self-propelled truck (14). Thus, the self-propelled truck (14) is moved on, with the female engagement member (28) raised as it is.

Further, in accordance with the present invention, another timer (not shown) is provided for presetting a time for the second motor (12) to be driven reversely so as to lower the female engagement member (28) down to the initial horizontal position shown by the solid line in FIG. 1. Namely, this female engagement member return time is counted by the timer from the point of time after the foregoing provisional stoppage time until the reverse drive of motor (12) is terminated for completing the return of female engagement member (28) to the horizontal lowered position. During this particular return time, the second motor (12) is driven reversely to cause the anticlockwise rotation of cam (28), which in turns causes downward displacement of both support rod (50) and lever member (40), and the female engagement member (28) is lowered or returned to the initial horizontal position shown by the solid line in FIG. 1. Of course, the time includes a certain length of time enough for the self-propelled truck (14) to move away a sufficient distance from the carrying truck (16) uncoupled therefrom, taking into account the speed of the self-propelled truck (14) or other conditions and circumstances.

Accordingly, with such arrangement, the carrying truck (16) is indeed placed in a stopped state, and with this state, the female engagement member (28) of self-propelled truck (14) is disengaged from the male engagement pin (30) of that carrying truck (16). Hence, the carrying truck (16) uncoupled from the self-propelled truck (14) is surely prevented against further movement in contrast to the inertia problem found in the prior art. It is therefore possible to transfer and leave the carrying truck (16) precisely at the destination on the path along which the self-propelled truck (14) moves on with the above-described uncoupling processes.

It is also appreciated that the setting of the foregoing female engagement member return time includes a sufficient length of time for the self-propelled truck (14) to move away a sufficient distance from the carrying ruck (16), and therefore, there is eliminated the possibility of the female engagement member (28) of self-propelled truck (14) being again engaged with the male engagement pin (30) of carrying truck (16). Namely, it is possible to insure uncoupling the carrying truck (16) from the self-propelled one (14).

It is further appreciated that, in contrast to the prior art, there is no need to provide any such uncoupling stand member on the floor, which avoids presence of any projected thing on the floor and secures a safety on the path (20).

In accordance with the present invention, it may be so arranged that there is defined a deceleration point before the uncoupling point, where the motor (22a) of self-propelled truck (14) is slowed donwn to decelerate both two tucks (14)(16), whereby the decelerated trucks (14)(16) is to be stopped at the uncoupling point defined by the tape 56 in FIG. 2. Referring to FIG. 2, another tape (60) is adhered on the floor, which defines such deceleration point, a certain distance before the uncoupling position tape (56). In operation, when the photosensor (58) of self-propelled truck (14) senses a light reflected from that deceleration position tape (60), the control device instructs the motor (22a) to slow down its rotational speed so as to cause deceleration of both two trucks (14)(16). In this regard, a proper circuit arrangement may be added in the control device in order to discriminate the deceleration position tape (60) from the uncoupling position tape (56), by, for example, depending on the number of detections for those two tapes. With another embodiment, it is possible to decrease an inertia force in both two trucks (14)(16) before they reach the uncoupling point, and thus the carrying truck (16) can be stopped at the uncoupling point, with more accuracy. This prevents the goods on the truck (16) from falling therefrom when it is stopped at the uncoupling point.

While having described the present invention as above, it should be understood that the invention is not limited to the illustrated embodiment, but any other modifications, replacements and additions may be applied thereto without departing from the spirits and scopes of the appended claims. For instance, the aforementioned return of female engagement member (28) may be carried out by use of another light reflecting tape and associated control arrangement, instead of the timer. Further, the male engagement pin (30) may be provided at the self-propelled truck (14) and vertically movable with respect to the uncoupling device (10).

What is claimed is:

1. A method for uncoupling a self-propelled truck from a carrying truck, wherein said self-propelled truck includes a first motor and is moved thereby along a predetermined path, with said carrying truck coupled therewith via a coupling device, and wherein said coupling device comprises a female engagement means and male engagement means, said method comprising the steps of:

defining an uncoupling point in said predetermined path;

permitting said uncoupling point to be detected by a sensor means provided in said self-propelled truck;

permitting disengagement of one of said female and male engagement means from another of them by means of a second motor in order to uncouple said carrying truck from said self-propelled truck;

if said sensor means detects said uncoupling point, causing said first motor of said self-propelled truck to be temporarily stopped, thereby provisionally stopping said carrying truck, while causing said second motor to be driven for effecting said disengagement between said male and female engagement means;

then, restarting drive of said first motor to move only said self-propelled truck, while maintaining said disengagement, to complete uncoupling said carrying truck from said self-propelled truck; and after said self-propelled truck is moved away from said carrying truck, restarting drive of said second motor to cause one of said female and male engagement means to return to an initial position.

2. The method as defined in claim 1, wherein said method further includes the steps of:

defining, on said predetermined path, a deceleration point before said uncoupling point, said deceleration point being an point where said self-propelled truck is decelerated;

permitting said deceleration point to be detected by a deceleration position sensor provided by said self-propelled truck;

if said deceleration position sensor detects said deceleration point, causing said first motor to decrease its rotational speed to decelerate both said self-propelled and carrying trucks, then, if said uncoupling point is detected by said sensor means, causing said first motor to be temporarily cease its drive to effect said provisional stop of both said self-propelled and carrying trucks; and thereafter, causing said disengagement between said female and male engagement means.

3. The method as defined in claim 1, wherein said method includes the steps of:

presetting a provisional stoppage time during which said first motor is temporarily stopped to effect said provisional stop of said self-propelled and carrying trucks, said provisional stoppage time including a length of time sufficient for said second motor to drive for completing said disengagement between said female and male engagement means; and after lapse of said provisional stoppage time, causing only said first motor to restart its drive so as to move said self-propelled truck only, while maintaining said disengagement between said female and male engagement means.

4. The method as defined in claim 3, wherein said provisional stoppage time is preset and counted by a timer.

5. The method as defined in claim 1, wherein said method includes the steps of:

presetting an engagement means return time at which one of said female and male engagement means is returned to said initial position, said engagemeant means return time including a time sufficient for said self-propelled truck to move away a sufficient distance from said carrying truck;

after lapse of said engagement means return time, causing said second motor to restarts its drive so as to complete the return of one of said female and male engagement means to said initial position.

6. The method as defined in claim 5, wherein said engagement means return time is preset and counted by a timer.

7. A device for uncoupling a self-propelled truck from a carrying truck, in which a coupling device is provided between said self-propelled and carrying trucks, including a female engagement means and a male engagement means, and one of said female and male engagement means is provided at one of said self-propelled and carrying trucks, said device comprising:

a motor;

a support lever means operatively connected with said motor, upon which support lever means, said one of said female and male engagement is supported, a means for defining an uncoupling point on a path along which said self-propelled truck moves, said uncoupling point being a point where said carrying truck is to be uncoupled from said self-propelled truck;

a sensor means for detecting said uncoupling point, sensitive to said means for defining an uncoupling point, said sensor means being electrically connected with said motor via a control means;

wherein if said seonsor means detects said uncoupling point, said motor is driven to actuate said support lever means to disengage one of said female and male engagement means from another of them, so that said carrying truck is uncoupled from said self-propelled truck at said uncoupling point.

8. The device as defined in claim 1, wherein said means for defining an uncoupling point is a light reflecting tape disposed in said path and said sensor means comprises a photosensor which detects said uncoupling point, sensitive to a light reflected from said tape.

9. The device as defined in claim 1, wherein said support lever means comprises a support lever member which is free to move vertically relative to said self-propelled and carrying trucks, and a means for transforming a drive of said motor into the vertical movement of said support lever member, and wherein operation of said motor causes vertical movement of one of said female and male engagement means towards and away from another of them, through said support lever member and means for transforming drive of said motor into vertical movment of said support lever member.

10. The device as defined in claim 9, wherein said means for transforming drive of said motor into vertical movement of said support lever comprises a cam and a support rod formed thereon, wherein said cam is fixed to an output shaft of said motor and wherein, upon said support rod, said support lever member is supported.

* * * * *